United States Patent
Burns et al.

[11] Patent Number: 6,052,056
[45] Date of Patent: Apr. 18, 2000

[54] SUBSTANCE DETECTION SYSTEM AND METHOD

[75] Inventors: Joseph D. Burns, Parker; Mark V. Anderson, Littleton, both of Colo.

[73] Assignee: ICG Technologies, LLC, Phoenix, Ariz.

[21] Appl. No.: 08/933,643

[22] Filed: Sep. 19, 1997

Related U.S. Application Data

[63] Continuation-in-part of application No. 08/639,353, Apr. 26, 1996, Pat. No. 5,760,711.
[60] Provisional application No. 60/043,872, Apr. 10, 1997.

[51] Int. Cl.[7] .................................................. G08B 19/02
[52] U.S. Cl. ...................... 340/583; 250/573; 73/170.26; 340/962
[58] Field of Search .................................. 340/962, 583; 750/573; 73/170.26; 324/674, 134 E, 134 F; 356/382, 355

[56] References Cited

U.S. PATENT DOCUMENTS

| | | | |
|---|---|---|---|
| 3,976,270 | 8/1976 | Catchpole | 244/134 F |
| 4,054,255 | 10/1977 | Magenheim | 244/134 F |
| 4,210,021 | 7/1980 | Vykhodtsev et al. | 73/170.26 |
| 4,274,091 | 6/1981 | Decker | 340/583 |
| 4,379,227 | 4/1983 | Kovacs | 250/231.1 |
| 4,461,178 | 7/1984 | Chamuel | 73/599 |
| 4,553,137 | 11/1985 | Marxer et al. | 340/582 |
| 4,570,881 | 2/1986 | Lustenberger | 244/134 F |
| 4,604,612 | 8/1986 | Watkins et al. | 340/582 |
| 4,611,492 | 9/1986 | Koosmann | 73/579 |
| 4,628,736 | 12/1986 | Kirby et al. | 73/590 |
| 4,688,185 | 8/1987 | Magenheim et al. | 702/172 |
| 4,745,804 | 5/1988 | Goldberg et al. | 73/170.26 |
| 4,766,369 | 8/1988 | Weinstein | 324/670 |
| 4,775,118 | 10/1988 | Daniels | 244/134 D |
| 4,782,331 | 11/1988 | Martens | 340/583 |
| 4,797,660 | 1/1989 | Rein, Jr. | 340/583 |
| 4,803,470 | 2/1989 | Fineman | 340/583 |
| 4,808,824 | 2/1989 | Sinnar | 250/339.11 |
| 4,819,480 | 4/1989 | Sabin | 73/170.26 |
| 4,882,574 | 11/1989 | Khurgin | 340/581 |
| 4,913,519 | 4/1990 | Klainer et al. | 385/12 |
| 4,980,673 | 12/1990 | Kleven | 340/581 |
| 5,003,295 | 3/1991 | Kleven | 340/581 |
| 5,005,015 | 4/1991 | Dehn et al. | 340/962 |
| 5,014,042 | 5/1991 | Michoud et al. | 340/583 |
| 5,095,754 | 3/1992 | Hsu et al. | 73/602 |
| 5,134,380 | 7/1992 | Jonas | 324/674 |
| 5,140,135 | 8/1992 | Freeman | 219/497 |
| 5,180,122 | 1/1993 | Christian et al. | 244/134 F |
| 5,206,806 | 4/1993 | Gerardi et al. | 361/679 |
| 5,243,185 | 9/1993 | Blackwood | 250/225 |
| 5,270,537 | 12/1993 | Jacobs | 250/227.15 |
| 5,296,853 | 3/1994 | Federow et al. | 340/962 |

(List continued on next page.)

*Primary Examiner*—Benjamin C. Lee
*Attorney, Agent, or Firm*—Steven G. Lisa; Douglas W. Rudy

[57] ABSTRACT

A modulated light source (31) transmits light pulses through an optical channel (20) to an optical sensor (10) remotely located from the cockpit and mounted proximate an aerodynamic surface (14) of an aircraft. In the absence of ice a baseline amount of light is returned inward via the optical channel. When water, ice, or de-icing fluid covers the light sensor, a detectable variable amount of light pulses are returned by the sensor inward through the optical channel, and are detected by a light detector (34) which generates an electrical output signal that varies as a function of the type, amount, and rate of substance accretion. The output signal is visually displayed (37) and the pilot may also be audibly warned. In one alternate embodiment the remote light sensor (70) may be fuselage mounted (72) with an airfoil shaped probe (71) having a clear lens in the leading edge (73) to which is secured a single fiber optic channel 76 or a pair of fiber optic light pipes (75,76), one for outbound (76) and the other for inbound (75) light pulses. In another embodiment, the optical sensor is mounted in the throat 93 of a carburetor 92 to detect carburetor ice. All electronics are housed in the logic or control/display unit (30) other than the fiber optic cable and remote mounted light sensor. Analog and digital implementations are disclosed.

25 Claims, 9 Drawing Sheets

U.S. PATENT DOCUMENTS

| | | | |
|---|---|---|---|
| 5,301,905 | 4/1994 | Blaha | 244/134 F |
| 5,313,202 | 5/1994 | Hansman, Jr. et al. | 340/962 |
| 5,317,452 | 5/1994 | Prentiss et al. | 359/819 |
| 5,354,015 | 10/1994 | Meador | 244/134 F |
| 5,394,340 | 2/1995 | Inkpen et al. | 702/33 |
| 5,396,079 | 3/1995 | Evers et al. | 250/577 |
| 5,467,944 | 11/1995 | Luukkala | 244/134 F |
| 5,474,261 | 12/1995 | Stolarczyk et al. | 244/134 F |
| 5,475,370 | 12/1995 | Stern | 340/583 |
| 5,484,121 | 1/1996 | Padawer et al. | 244/134 F |
| 5,507,183 | 4/1996 | Larue et al. | 73/598 |
| 5,528,224 | 6/1996 | Wang | 340/583 |
| 5,533,508 | 7/1996 | Doiron | 600/317 |
| 5,541,733 | 7/1996 | Gagnon | 356/382 |
| 5,596,320 | 1/1997 | Barnes | 340/962 |
| 5,641,972 | 6/1997 | Breda | 250/573 |
| 5,650,851 | 7/1997 | Gagnon | 356/355 |
| 5,795,300 | 8/1998 | Bryars | 600/500 |
| 5,823,474 | 10/1998 | Nunnally | 244/134 E |

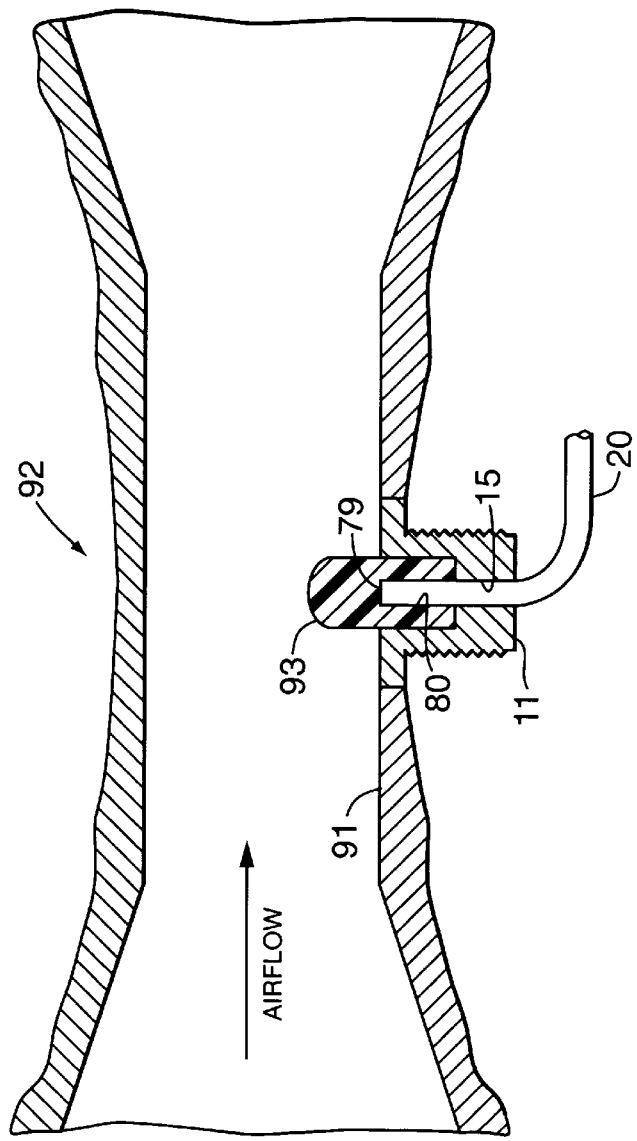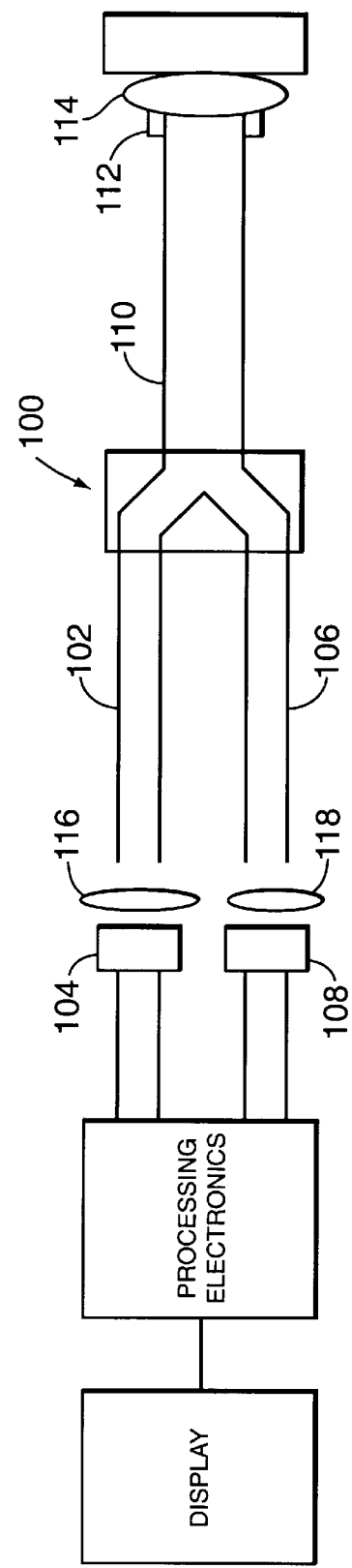

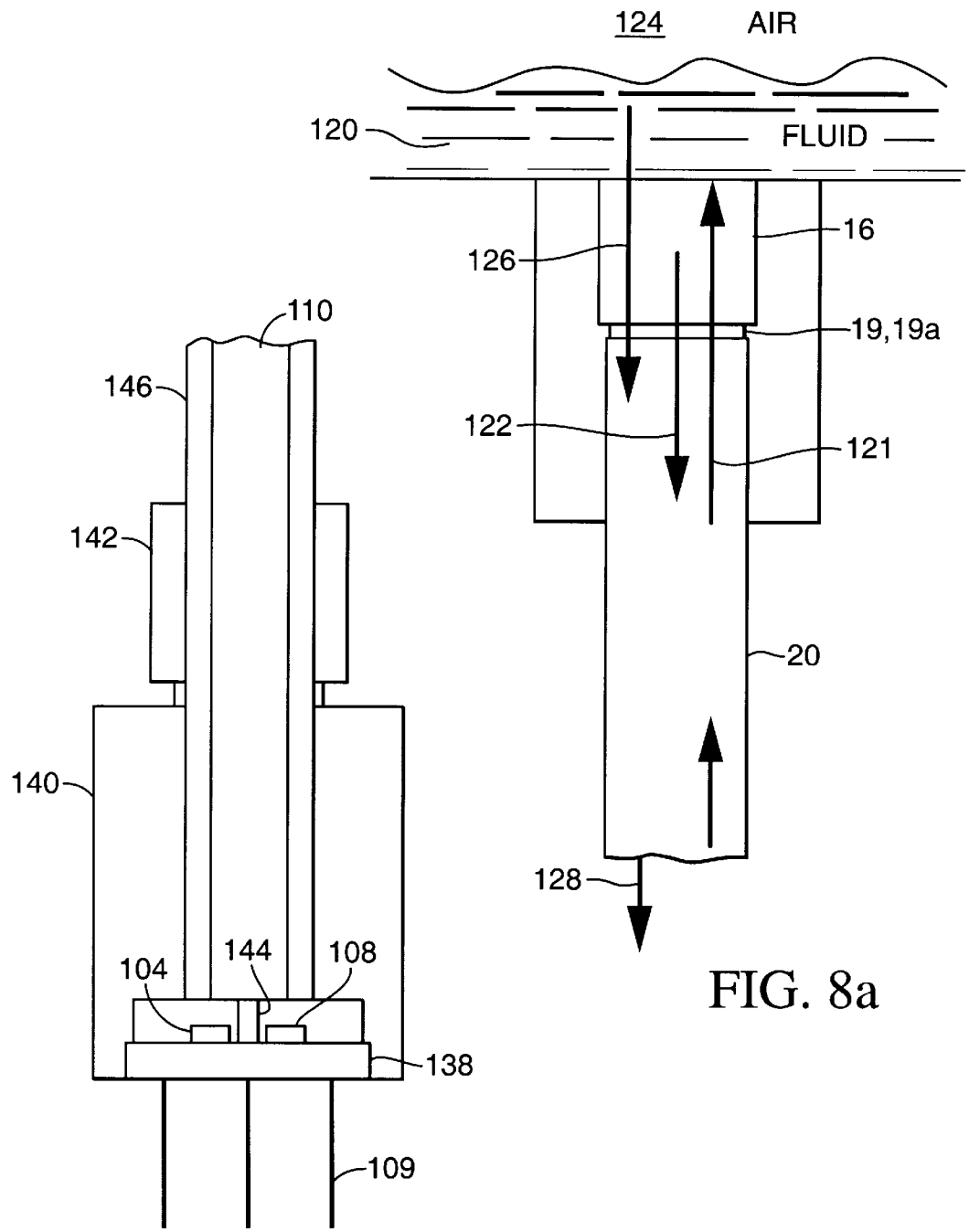

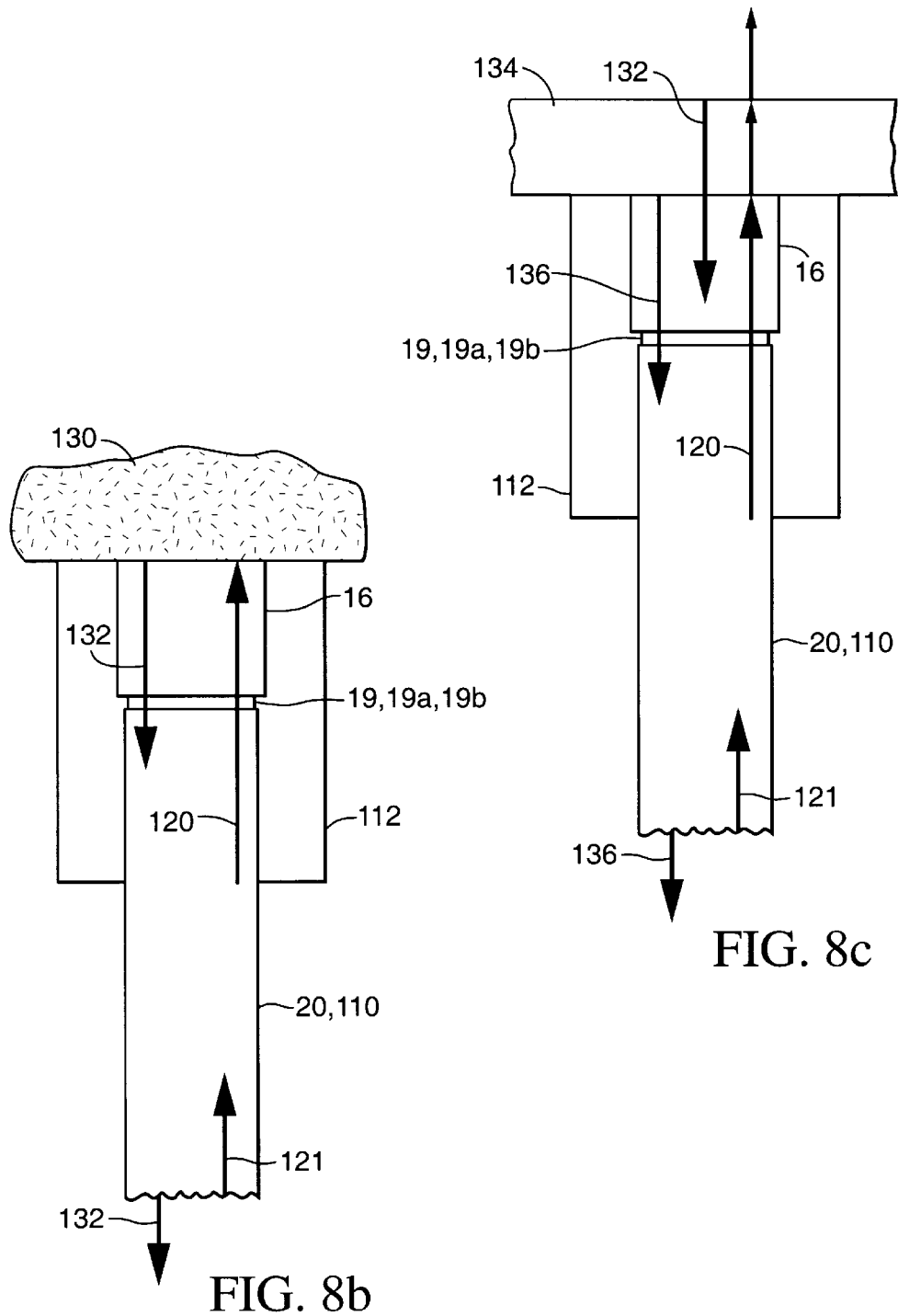

SUBSTANCE DETECTION SYSTEM AND METHOD

CROSS-REFERENCE TO RELATED APPLICATIONS

This is a continuation-in-part application of application Ser. No. 08/639,353 filed Apr. 26, 1996 now U.S. Pat. No. 5,760,711, and is related to copending provisional application Ser. No. 60/043,872 filed Apr. 10, 1997.

BACKGROUND OF THE INVENTION

1. Fields of the Invention

The present invention relates generally to systems and methods for detecting ice or fluid on a surface, such as on a roadway or aircraft wing or tail, and more particularly, to the use of a remote optical sensor that is located at or near the area or aerodynamic surface where icing most likely occurs. The sensor is coupled by a light channel to a logic unit and ice indicator positioned along a roadway or in a control center or cockpit, which indicator can warn and differentiate type, rate, and thickness of substance accumulation and ice accretion.

2. Discussion of the Prior Art

Aircraft technology has progressed by leaps and bounds over the past 60 years of powered flight. However, a nagging problem since the inception of IFR flight has been the unresolved safety concern surrounding in-flight icing. Thousands of deadly accidents have been attributed to airframe icing. This unfulfilled need has been most emphatically driven home by a recent commercial accident which has taken the lives of many passengers.

Modern aircraft are equipped with a wide variety of equipment which detect and warn pilots of hazardous weather conditions. Notwithstanding these advances, modern aircraft are still not adequately equipped to detect and warn pilots of ice adhering to critical parts of their airframe. Federal Regulations prohibit flight in icing conditions that exceed those defined in F.A.R. Part 25, Appendix C. Nonetheless, flights are regularly made by commercial aircraft on authorized flights into freezing drizzle or freezing rain, where the size of supercooled water droplets, suspended in air and ready to freeze on the first solid object they touch, exist in the atmosphere and pose the greatest icing hazard. Freezing drizzle, in particular, is a silent invisible killer which is only made worse by darkness and its accumulation on aircraft parts not visible to the pilot under any circumstances, such as, tail surfaces where ice build-up is especially lethal.

A fundamental problem according to the Airline Pilots' Association, is that there exists a serious disharmony between the criteria used for certification of an aircraft and the criteria used for dispatch and operation of that aircraft. Thus, there is a long felt need for a reliable method of detecting critical icing conditions from the cockpit so that once icing conditions are encountered, they may be rapidly and accurately detected and the pilot can then either remove the ice with anti-ice systems or alter course and get out of the hazardous condition before a dangerous amount of ice accumulates on critical aerodynamic surfaces.

Over the years a wide variety of aircraft ice detection systems have been invented employing virtually every known physics principle, with limited success. Just to name a few, such systems have included, for example, a pneumatic system of Blaha in U.S. Pat. No. 5,301,905; the temperature systems of Kleven in U.S. Pat. No. 4,980,673 and Hansman in U.S. Pat. No. 5,313,202; the vibrational systems of Marxer in U.S. Pat. No. 4,553,137 and Koosmann in U.S. Pat. No. 4,611,492 (Assignee Rosemount); the force system of Daniels in U.S. Pat. No. 4,775,118 (Assignee Boeing); the ultrasonic system of Watkins in U.S. Pat. No. 4,604,612; and the flush mounted electrical/temperature hybrid system of Weinstein (Assignee NASA) in U.S. Pat. No. 4,766,369. None of these systems has achieved any widespread commercial success.

It is also known to use aircraft ice detection systems having optical components. For example, in a system to Mischoud in U.S. Pat. No. 5,014,042 there is disclosed a system which employs an optical channel employing a prism sensor at one end of an optical channel comprising a fiber optic bundle which totally reflects light internally in a no ice condition, but refracts some of the incident light externally of the system in the presence of water or ice thereby detectably reducing or eliminating the amount of internally reflected light. In that system, rain produces a low frequency modulation of the quantity of reflected light which is demodulated to differentiate rain from ice. Mischoud does not disclose or suggest the use of an optical sensor having a single optical fiber, or a sensor that can distinguish between the type of ice using optical scattering and reflection, or further, that can differentiate between types of ice and de-icing fluid.

It is also been known to use an infrared laser light source in a remote location in the wing leading edge for deriving signals representative of icing used to provide a cockpit alarm as in the system to Federow U.S. Pat. No. 5,296,853. However, such system does not suggest the use of a laser as a light source remote from the optical sensor in the wing and coupled thereto by a light channel.

There are several ice detection systems in very limited use on present large aircraft. One such system uses a fuselage mounted 1" diameter gear that continually rotates when the aircraft is in flight. If any ice builds up on the gear, the ice will brush up against a microswitch as the gear rotates and will trigger a caution light to the flight crew. The system works so poorly that flight crews generally ignore the warnings, deferring to an also ineffective visual inspection. The main drawbacks of the system are the moving parts, the microswitch itself freezing up, and the fact that the system is not mounted on the wings or tail—the location where ice build-up is critical.

Another such known system is an ultrasonic ice detector currently being tested on small passenger jets—aircraft particularly susceptible to ice. The sensor uses about 4" of wing space and consists of a disk that vibrates continuously. Any ice build-up changes the frequency of the vibration and thus alerts the pilots. There are also several drawbacks with this unit, too. First, it is also a non-solid state product. The cold high altitude temperatures and temperature changes make frequency calibration unreliable. Secondly, due to the size of the unit and the flat wing space required it cannot be mounted on the curved leading edge of the wing-the very first area to be affected by ice build-up. By the time any ice would cover this unit, the accumulation could be severe. The other drawbacks of this system are high cost, environmentally exposed wing-mounted electronics, and a lack of redundancy-only one sensor per aircraft.

See also, U.S. Pat. Nos. 4,803,470; 5,270,537; 5,484,121; 5,528,224 and 5,596,320 for additional ice detection systems and methods. At the present time there are no known, reliable and cost-effective electronic ice detection systems for small or mid-size aircraft, and that also can be used to detect ice on other surfaces, such as on roadways or carburetor induction systems.

Accordingly, as indicated above, there is still a long felt need for an effective ice detection system for all aircraft, large or small, and it is the primary object of this invention to fill this need with a small, non-intrusive, solid state, low cost, remote ice detection system, which can be redundantly located at the critical surfaces most likely to be affected by ice build-up. The need further exists for ice detection systems and methods that can easily and cost effectively be employed to detect ice on other types of surfaces, such as roadways and carburetor induction systems.

SUMMARY OF THE INVENTION

Set forth below is a brief summary of the invention in order to achieve the forgoing and other benefits and advantages in accordance with the purposes of the present invention as embodied and broadly described herein.

It is an object of the invention to provide ice and fluid detection systems and methods that are reliable and cost-effective.

It is an object of the invention to provide ice and fluid detection systems and methods that can be used to monitor a wide variety of surfaces.

It is an object of the invention to provide ice and fluid detection systems and methods that operate by sensing different light reflecting, refracting or scattering characteristics of materials or fluids accumulating on a surface.

It is an object of the invention to employ ice and fluid detection systems and methods that use a single optical fiber light channel leading to an optical sensor positioned proximate a surface to be monitored.

It is a further object of the invention to provide ice and fluid detection systems and methods that use laser or light emitting diodes, or super-bright emitters, as a light source.

It is further an object of the invention to provide ice and fluid detection systems and methods that allow the use of light sources selected from among those in a wide range of modulation frequencies and wavelengths.

It is an object of the invention to provide ice and fluid detection systems and methods that house the light source remote from the optical sensor, such as in a service compartment or in a cockpit indicator or electronics unit, and that couple the remote light source to an optical sensor via an optical fiber light channel.

It is an object of the present invention to provide ice and fluid detection systems and methods that employ an optical light sensor which detects a decreased amount of light in the presence of clear ice, a decreased and fluctuating amount of light in the presence of fluid, and an increased amount of light in the presence of rime ice.

It is further an object to provide ice and fluid detection systems and methods that employ an optical ice sensor that is capable of differentiating between types of ice, water, and de-icing fluid, and that identify the amount and rate of ice accretion on the optical sensor.

It is an object of the invention to provide ice and fluid detection systems and methods that can detect rime (or milky) ice by sensing an increased amount of returned light relative to a no-ice condition, as caused by increased scattering of light due to imperfections and interfaces within the rime ice.

It is another object of invention to provide ice and fluid detection systems and methods that detect clear ice by sensing a decreased amount of returned light relative to a no-ice condition.

It is another object of the invention to provide a ice and fluid detection systems and methods that sense the presence of water on a surface by detecting a decreased and fluctuating amount of returned light relative to a no-ice condition, by sensing the vibrating nature of a water/air interface.

It is another object of the invention to provide ice and fluid detection systems and methods that distinguish between water and de-icing fluid by detecting the differences in reflection due to differences in index of refraction or viscosity between de-icing fluid and water.

It is another object of the invention to provide optical ice and fluid detection systems and methods that make use of optical filtering.

It is another object of the invention to provide ice and fluid detection systems and methods that use aerodynamic surfaces installed on an airframe.

It is another object of this invention to provide ice and fluid detection systems and methods that use a coadunate, or co-located, emitter and detector coupled by a single optical fiber to a remote optical sensor that is located at the surface to be monitored.

It is another object of this invention to use the ice detection systems and methods not only to indicate the presence of ice on aerodynamic surfaces, but also to automatically control de-icing systems for those surfaces, such as by selectively activating de-icing systems in areas of ice accumulation.

The above and other objects are achieved by substance detection systems and methods that included an optical sensor adapted to be mounted to a surface that is exposed to atmospheric weather conditions and which variably returns light as a a function of the nature and amount of a substance which accretes on the surface. An optical channel is coupled to the optical sensor, and a logic unit is coupled to the optical channel. A modulated light source is configured to transmit light pulses through the optical channel to the optical sensor. The optical sensor variably returns an amplitude or amount of the light pulses indicative of the presence of a substance on the optical sensor. A light detector receives the returned light pulses from the optical sensor through the optical channel, and generates an electrical output signal indicative of the returned light pulses.

In accordance with a further feature of the invention, the surface to be monitored is an aerodynamic surface of an airframe, and the logic unit includes a digital computer and visual display adapted to be mounted in an aircraft instrument panel. The substances to be detected are ice, water, or de-icing fluid. The output signal indicating the presence of ice may be used to activate de-icing equipment.

In accordance with a further feature of the invention, the optical sensor has a flush mounting to the external surface that is monitored, and includes a base having a beveled peripheral portion, adapted to seat in a beveled recess in the external surface, and a central bore, a single sided convex lens having its flat side outboard and its convex side inboard secured to the outboard end of the central bore, an optical fiber secured to the inboard end of the central bore and operatively coupled to the lens, a zero refractivity indexing gel filling the air gap between the lens and the optical fiber, and an o-ring compressed against the outside wall of the optical fiber to secure the fiber in the bore.

In accordance with a further feature of the invention, the base of the optical sensor has a peripheral portion the size and shape of a standard aircraft rivet adapted to mount into an aircraft rivet hole, or, for new installations, has a threaded peripheral portion adapted to directly mount into an aircraft airframe structure.

In accordance with a further feature of the invention, the optical channel is a monofilament multi-mode optical fiber light guide, and the coupling between the logic unit and the optical channel is a prism assembly for transmitting the emitted light pulses from the light source to the optical sensor and the reflected light pulses from the optical sensor to the light detector. Any reasonable alternative to a prism can be used. For example, the commercially available optical coupling known by the tradename "FiberSwitch™" could be used. See U.S. Pat. Nos. 5,163,112, 5,408,550, 5,548,669, and in a co-pending application Ser. No. 08/590, 692, all of which are assigned to Wireless Control Systems, Inc., and are incorporated herein by reference, for further details on the FiberSwitch™

A further aspect of the invention includes a logic unit which further includes a computer/display unit having a digital computer for providing a display signal indicative of the output signal from the light detector, and a display for visually presenting the display signal. The display may include any one or all of the following: an indication of the presence of water, de-icing fluid, clear ice, or rime ice on the optical sensor; an indication of the amount or rate of ice accretion; a warning signal indicative of the output signal from the light detector; an audio circuit for aurally presenting the warning signal as a tone or digitized voice warning; an indicator for warning a human operator of the proper or improper operation of the system. The digital computer may also provide output signals for automatically controlling de-icing equipment.

The above and other objects are also achieved by substance detection systems and methods that use an optical sensor placed proximate a surface to be monitored, which sensor is coupled by a first optical fiber to an optical coupler/splitter. The optical coupler/splitter is coupled by a second optical fiber to a light source. The light source generates light pulses that are transmitted through the optical coupler/splitter to the optical sensor. The optical coupler/splitter is also coupled by a third optical fiber to a light detector. The optical coupler/splitter operates to transmit light that is returned from the optical sensor to the light detector. The light detector generates a signal that varies as a function of the amount of light it detects. A processing unit is coupled the detector and is configured to analyze the signals generated by the detector to identify (a) the absence of any substance on the surface to be monitored; (b) the presence and type of ice on the surface to be monitored; and (c) the presence and type of fluid on the surface to be monitored. The processor is coupled to an indicator, to indicate the condition of the surface to be monitored. In a preferred form, the optical coupler/splitter may be a Lensed Multimode Wavelength Division Multiplexor, such as the product sold by AMP under the part number AMP 107826-1.

The above and other objects are also achieved by substance detection systems and methods that employ an optical sensor placed proximate a surface to be monitored, and which is coupled by a first optical fiber to a light source located remote from the sensor. The light source may be a solid state emitter, such as an LED or laser diode, and generates light pulses that are transmitted through the optical fiber to the optical sensor. The optical sensor is configured to return a varying amount of the light pulses transmitted from the light source as a function of the presence of a substance on the surface. A photo-detector, such as a photo-voltaic detector, or an LED or laser diode configured as a light detector, is coupled to the optical fiber proximate the light source. In a preferred form, the photo-detector is an LED that detects the light pulses returned from the optical sensor in a narrow bandwidth centered on the wavelength at which the laser diode emits light. The laser diode generates an electrical signal that varies in accordance with variations in the characteristics of the returned light pulses. A processing unit is coupled the detector and is configured to analyze the signals generated by the detector to identify (a) the absence of any substance on the surface to be monitored; (b) the presence and type of ice on the surface to be monitored; and (c) the presence and type of fluid on the surface to be monitored. The processor is coupled to an indicator, to indicate the condition of the surface to be monitored, and may also be employed to control de-icing equipment.

The above and other objects are also achieved by a substance detection using an optical sensor placed proximate a surface to be monitored. The optical sensor is configured to return light pulses as a function of the presence or absence and type of substance on the monitored surface. An optical channel is coupled to an outboard end of the optical sensor. A light source is coupled to the optical channel and configured to generate light pulses that are communicated to the optical sensor. A photo-detector is coupled proximate an inboard end of the optical channel and is configured to (i) detect light pulses that are returned from the optical sensor in a narrow bandwidth centered on the wavelength at which the emitter is designed to emit light, and (ii) generate an output signal that varies in accordance with variations in the detected light pulses. A processing circuit is coupled to the output of the photo-detector and is configured to process the output signals and determine the presence and type of substance on the surface to be monitored. The processing circuit includes an output defining the presence and type of substance on the surface. An indicator is coupled to the output of processing circuit and configured to indicate the presence and type of substance on the surface.

The above and other objects are also achieved by a method of detecting a substance on a surface. Light pulses are generated at a light source and transmitted over an optical channel to an optical sensor mounted proximate the surface. The optical sensor is configured to return over the optical channel an amount of the light that varies as a function of the presence and type of substance on the surface. The light pulses returned by the optical sensor are detected and a first signal is generated that varies in accordance with variations in the returned light pulses. Background light returned over the optical channel is periodically monitored in-between the detected light pulses returned by the optical sensor, and a second signal is generated that varies in accordance with any variations in background light. The second electrical signal is analyzed to determine a compensation factor that is a function of the amount of detected background light. The first electrical signals are analyzed, including applying the compensation factor to determine the presence and type of substance on the surface. The amplitude of the returned light pulses or modulated signal is the electrical signal of interest. AC coupling and electronic filtering can also be used to eliminate the signal produced by the background light. An indicating signal is generated to indicate the presence and type of substance on the surface. A signal may also be generated to automatically control de-icing equipment.

The above and other objects are achieved by a method for detecting a substance on a surface to be monitored, comprising mounting an optical sensor proximate the surface to be monitored and generating light pulses at a light source located remote from the optical sensor. The light pulses are transmitted over an optical channel to the optical sensor, which returns an amount of the transmitted light pulses over the optical channel, wherein the amount of returned light pulses is a function of the presence and type of substance on the surface to be monitored. A photo-detector is mounted proximate the optical channel, and generates an electrical output signal that varies in accordance with variations in the amount of light returned over the optical channel. The electrical output signal is processed to determine the presence of: (i) clear ice by detecting a decreased but not rapidly varying amount of light pulses returned by the optical sensor; (ii) rime ice by detecting an increased amount of light pulses returned by the optical sensor; and (iii) water by detecting a decreased but varying amount of light pulses returned by the optical sensor. An indicating signal is generated identifying the presence and type of substance detected on the surface to be monitored. In a preferred form, the light source and photo-detector comprise a co-located emitter and detector, such as that employed in the Fiber-switch™ discussed above, and the optical channel comprises a single optical fiber.

In summary, the system of the present invention serves as an ideal safety device to supplement and automatically detect in-flight icing conditions encountered by aircraft. With its small size and non-obtrusive installation of the optical sensor portion in the leading edge and other areas of critical aerodynamic surfaces in current aircraft, this system is able to fill the long felt need for a low cost ice detection system for all size aircraft. Due to its small size and low cost, the systems and methods of this invention can be adapted for use on roadways and engine induction systems.

BRIEF DESCRIPTION OF THE DRAWINGS

FIG. 6 is a vertical elevation view in partial section of a third embodiment of the optical sensor of the present invention with the optical sensor mounted perpendicular to the air flow through the throat of a carburetor.

FIG. 7 is a schematic view of an alternative embodiment of the invention employing an optical coupler and splitter to transmit light from the light source and to split returned light to send to the light detector.

FIG. 7A is a block diagram illustrating the operating principles of a co-located or coadunate emitter/detector operating to transmit and receive light over a single optical fiber.

FIG. 8A is a block diagram further illustrating the operational principles of the invention used to detect fluid.

FIG. 8B is a functional block diagram further illustrating the operational principles of the invention used to detect rime ice.

FIG. 8C is a functional block diagram further illustrating the operational principles of the invention used to detect clear ice.

DETAILED DESCRIPTION OF THE PREFERRED EMBODIMENT

1. Overview

Prior to the present invention, from the smallest two seat trainer to the largest commercial jet, ice detection has been and continues to be primarily a visual process. Typically, the flight crew notices an ice accumulation on some obstruction in front of the window—such as the windshield wiper blade. The ability to observe the actual wing ice build-up is very, if not completely, limited. At night, crew members use a flashlight to try to inspect surfaces.

Figure 1:
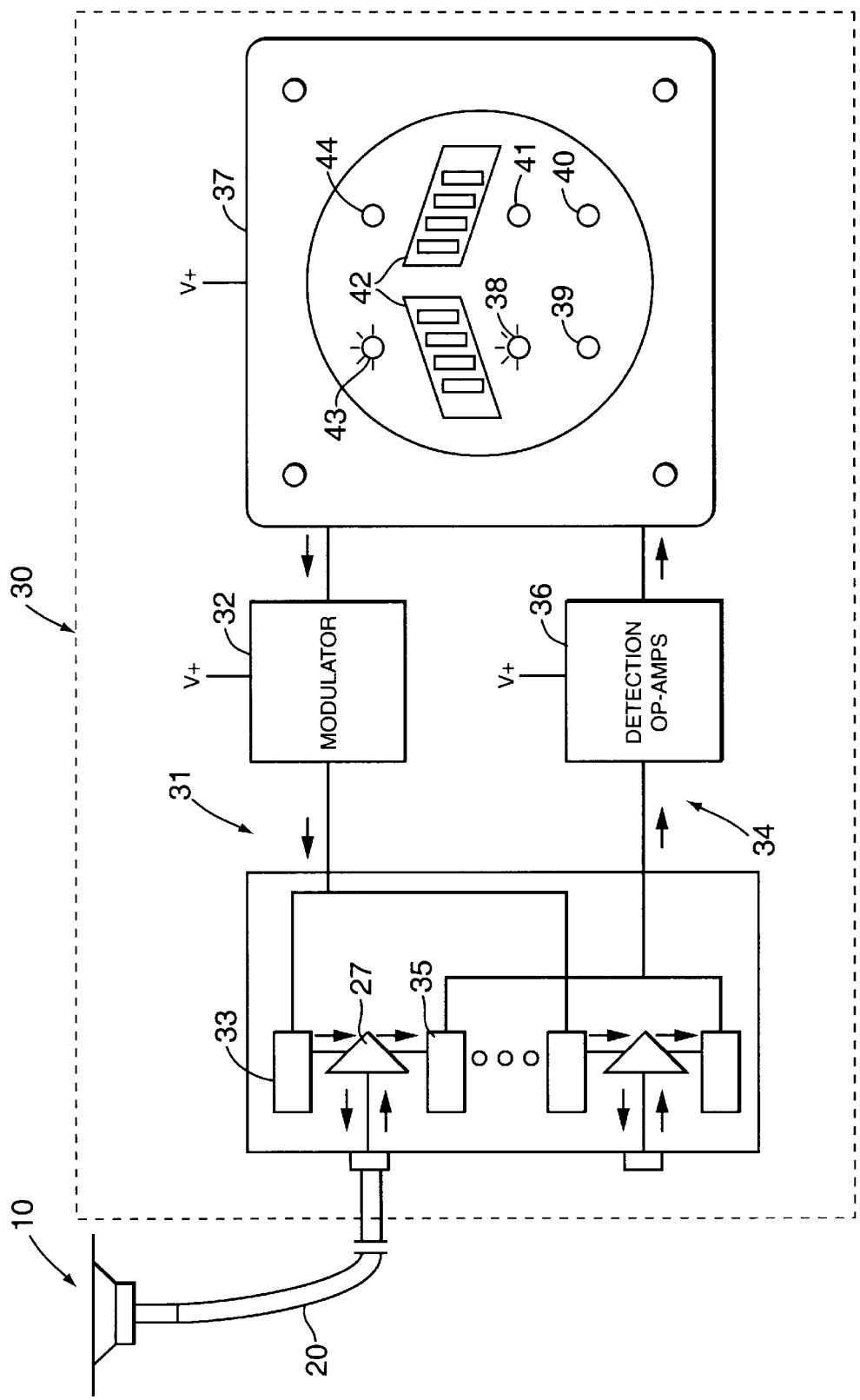
FIG. 1 is an overall schematic diagram of a first embodiment of the present invention.
Figure 1A:
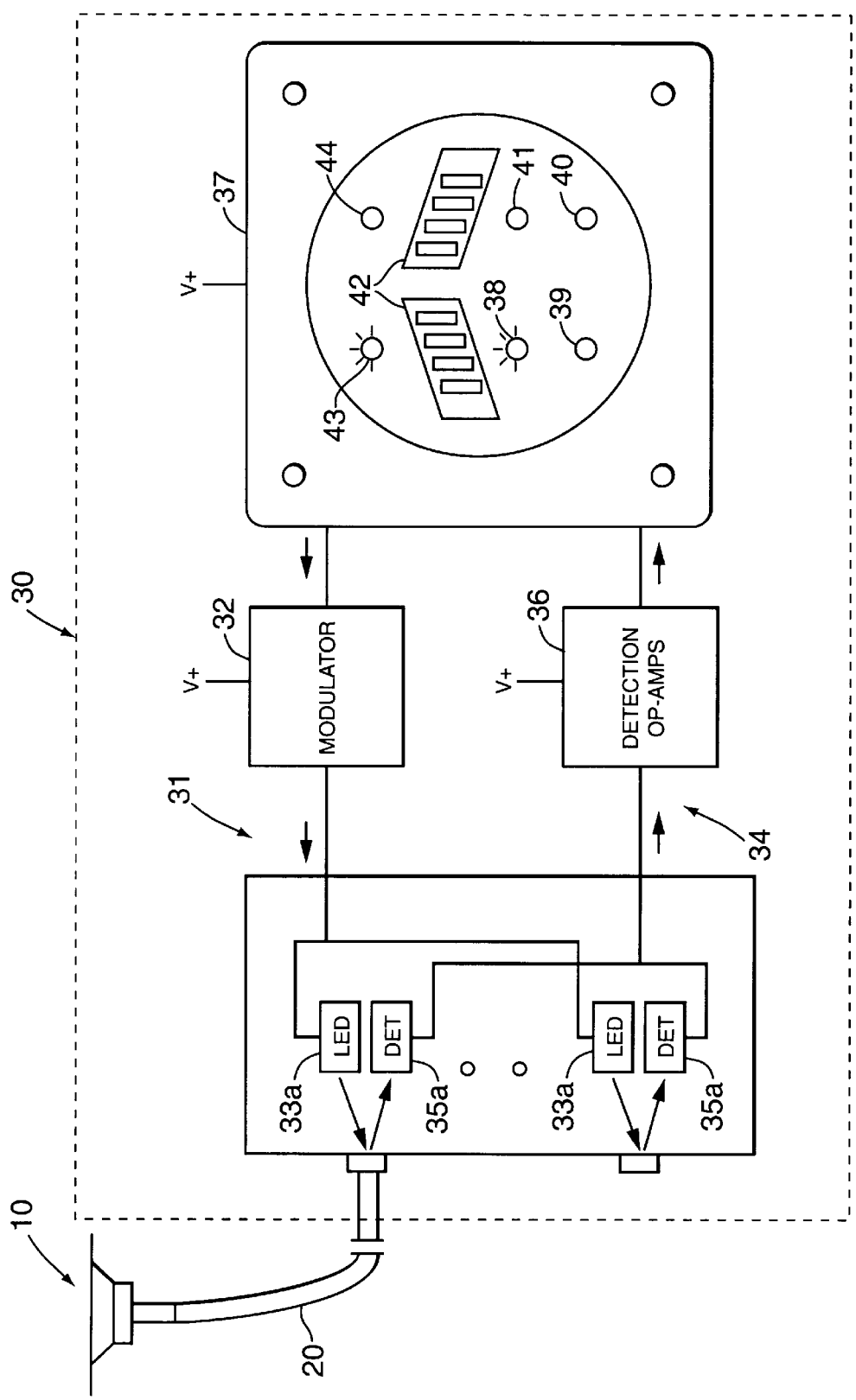
FIG. 1A is an overall schematic diagram of a modified and preferred form of the first embodiment of the invention shown in FIG. 1, in which the light source and detector are co-located proximate a single optical channel coupled to the sensor.

As seen in FIGS. 1, and 1A the ice detection system of the present invention includes three main components, the optical ice sensors 10, the fiber-optic sensor cables 20, and the computer or logic/display unit 30. The present invention eliminates the prior practice described above by actually looking up with the optical sensors 10, the axis of the optical sensor 10 being generally perpendicular to the plane tangent to the point or points, i.e., leading edge, on the aerodynamic surface being sensed, from several points on the wing or tail itself and automatically determining if certain fluids or ice accumulation on that critical surface is taking place. The signals from the wing or tail probes are then routed via optical fibers 20 to the cockpit mounted display/control unit 30 that aurally and visually warns the flight crew that icing conditions are being encountered. The warnings and indicators in turn give the crew an early, immediate cue to do something about that accumulation.

2. Fluid/Ice Detection Theory of Operation

The operation of the Ice/Fluid detection system is based on several optical principals. The system measures accretion on the detector lens surface by analyzing the amount of matched light reflected or returned back from a single light guide. These principles include refraction, reflection, and scattering.

The primary methods for detection and quantification of fluids on the ice detector surface are based on refraction and reflection. The fluid detection works as follows: The baseline lens to air index of refraction is typically 1.5 to 1.0. This baseline results in a set amount of light to be reflected or returned back down the light guide as this sharp refractive index forms a reflective boundary layer. As fluids layer upon the lens surface of the detector, the index is more gradually changed, allowing less light to be reflected back down the light guide with the index more closely matching the 1.5 index of the lens. The typical indices for water are 1.3 and deicing fluid approximately 1.4. The decreases in reflected light can be quantitatively measured (after proper system calibration) by the electronics package. This decreased light from the baseline signal is compared to a matched set of values, triggering the appropriate indications.

Referring additionally to FIG. 8A, the interface between the lens 16 and the fluid 120 causes a relatively constant amount of incident light 121 to be returned as indicated functionally by the arrow 122. The magnitude of those reflections 122 depend on whether the fluid is water or deicing fluid, which have slightly different indices of refraction. However, the interface between the fluid 120 and the air 124 varies due to nature of a fluid, as affected by wind or other vibration, thereby causing the light returned as a result of the fluid/air interface (indicated functionally by arrow 126) to correspondingly vary. Thus, the total light returning from the presence of fluid (indicated functionally by arrow 128) on the surface to be monitored will vary as a result of the contribution of the returned light at the varying fluid/air interface. By using electronic filters and Fourier analysis, the presence of the fluid can be detected.

Referring additionally to FIG. 8B, the primary method of rime ice detection using the same device is based on the principles of scattering and reflection. The detection of rime ice works as follows: Ice 130 is comprised of a fractured crystalline structure of water that is reflective and opaque in nature. However, the opacity of ice is affected by "sublimation", a deterioration and removal of the ice layer caused by friction as the ice travels through the airstream. This deterioration causes the ice surface to become more opaque and crystalline, or fractured, thus reflective in nature. As ice 130 layers upon the device the incident light is scattered and reflected more and back into the light guide due to internal scattering and reflection within the layer, as represented functionally by arrow 132 in FIG. 8B. This increased reflection of matched light is also quantitatively and qualitatively measured by the electronics package and matched to a set of values, triggering the appropriate systems indications. Ice that includes imperfections within its structure is often referred to as "rime" ice, and is detected as a result of an increased amount of returned or scattered and reflected light 132.

Referring now to FIG. 8C, clear ice 134 (generally without the imperfections characterizing rime ice) has an index of refraction of about 1.3, which is very close to the 1.33 index of refraction of water, as discussed above. Thus, the presence of clear ice 134 will provide a reduced but relatively constant amount of returned light relative to a baseline dry condition, as represented functionally by arrow 136. This is due to the fact that the index of refraction of clear ice (about 1.3) more closely matches the index of refraction of the sensor (which is 1.5) than does air (having an index of 1.0). The systems and methods of the present invention distinguish between the presence of clear ice 134 (FIG. 8C) and water 120 (FIG. 8A) on the monitored surface by detecting the varying amount of returned light caused by the varying fluid/air interface, as discussed above. Thus, if the returned light 136 is rapidly changing, the systems and methods of the present invention are able conclude that water, not clear ice, is present on the monitored surface.

3. The Optical Sensor

In the embodiment of FIGS. 1 and 1A the optical sensor 10 is adapted to be mounted to an external surface 14 (FIG. 3) directly exposed to outside weather conditions and increasingly or decreasingly reflects light as a function of the nature and amount of a substance which covers, coats or accretes on its outer surface, as more fully described below.

Figure 2:
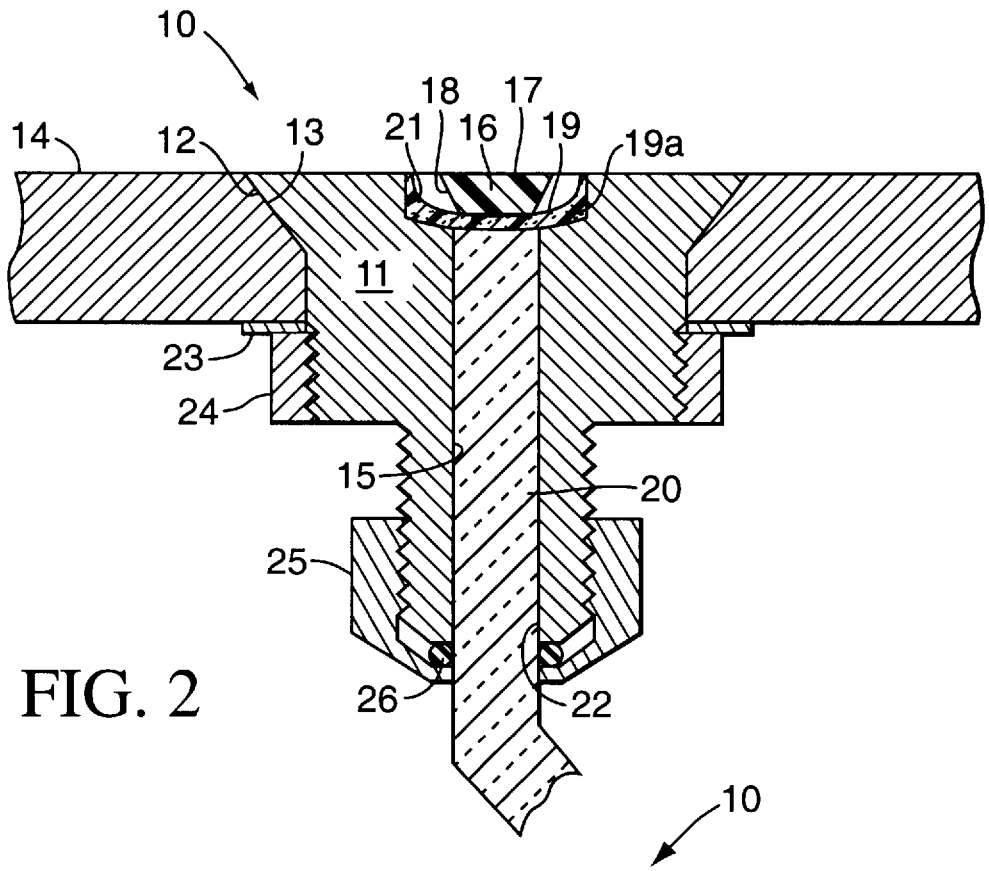
FIG. 2 is a partial sectional view of one form of the optical sensor of the present invention shown in FIGS. 1 and 1A flush mounted perpendicular to an aerodynamic surface of an aircraft airframe.

As seen in FIG. 2, one form of the optical sensor 10 has a base portion 11 machined out of an actual aircraft rivet designed for a particular aircraft and is located in ice critical areas of the skin where ice build-up first accumulates, i.e., on leading edge stagnation points of an airfoil and also on several positions back from this leading edge along the aerodynamic chord to determine the extent of the substance build-up. Base 11 has a beveled periphery portion 12 adapted to seat in a beveled recess 13 of the external surface 14 and to be thereby flush mounted in surface 14, which may be, for example, the aerodynamically shaped (flat or curvolinear) wing skin of the aircraft or a similar portion of the aircraft fuselage or airframe or a concrete or macadam surface of a roadway. The flush mounting is designed to replace or simulate mounting in a rivet hole. To this end, the base 11 has a central bore 15 to which is secured by an optical glue 19A at the outer end 21 a single sided convex lens 16 having its flat side 17 pointing outward and its convex side 18 pointing inward. Optical fiber 20 is secured to the inboard end 22 of the central bore 15 and is operatively coupled to lens 16 by an index matching, UV cured optical glue or index matching gel, such as, zero refractivity indexing gel 19 which fills the air gap between the glued in lens 16 and the optical fiber 20 thereby effectively fusing the coupling between the lens 16 and optical fiber 20. The longitudinal axis of the central bore 15 and the optical fiber 20 are the same line and are perpendicular to a plane tangent to or co-planar with (as appropriate) surface 14 being sensed by sensor 10. Base 11 is secured to surface 14 by lock washer 23 and lock nut 24. Base 11 is made of any conventional material, such as, machined aluminum, the same material from which aircraft rivets are made. The preferred material is aircraft grade aluminum.

Lens 16 is a half-convex polished lens system. Lens 16 is made of any conventional material, such as, acrylic plastic. Equivalent materials are glass. Lens 16 has an index of refraction that is matched by the index of refraction of glue 19A. Optionally lens 16 may be totally omitted and may be effectively replaced by polishing the outboard ends of optical fiber 20, as more fully described below in connection with the embodiments of FIGS. 1, 1A, 5B, 5D, and 6.

Glue 19A is any conventional optical glue, such as, Norland Optical #68. Equivalent optical glues are Summers Optical J-91 or SK-9. The index of refraction of glue 19A is matched to the refractive index of lens 16 so that the reflectivity of the lens/glue interface is effectively zero.

Indexing gel 19 is a clear grease well known in the industry as index matching gel and has an index of refraction which matches that of both the lens 16 and the optical fiber 20 so that effectively the optical fiber/indexing gel and indexing gel/lens interfaces have zero reflectivity.

The optical sensor 10 has, preferably, an outside diameter of less than 6.35 mm and can be designed to mount in an existing standard aircraft rivet hole For new aircraft installations, a flush mounted threaded detector (not shown) would be available. It is envisioned that 4–5 of these detectors 10 would be mounted in each wing surface and several in each tail surface at ice-critical areas for the maximum ice detection capability. Each sensor 10 would require only one cable 20.

Figure 3:
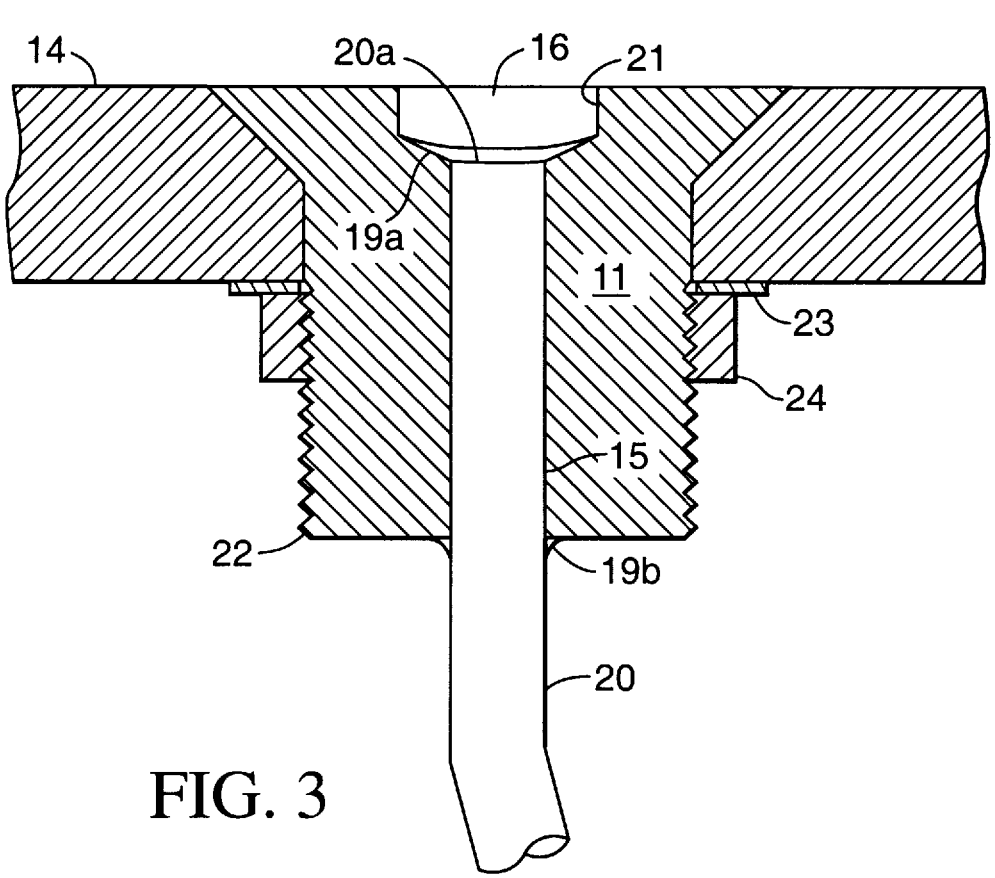
FIG. 3 is a partial sectional view of another form of the optical sensor of the present invention shown in FIGS. 1 and 1A flush mounted perpendicular to an aerodynamic surface of an aircraft airframe.

Another form of the optical sensor 10 of the embodiments of FIGS. 1 and 1A is shown in FIG. 3 in which components identical to those in FIG. 2 are shown with identical numbers. As seen in FIG. 3, base 11 is flush mounted in surface 14 and has central bore 15 in the outer recessed end 21 of which is mounted lens 16 secured therein and to the polished end 20A of optical fiber 20 by optical glue 19A which fills the gap therebetween. The longitudinal axis of fiber 20 is perpendicular to the exterior surface of surface 14 (flat) or to the plane tangent to the point or points on surface 14 (curvo-linear) being sensed. Base 11 is secured to surface 14 by washer 23 and locknut 24. Glue 19A may also be applied to the outside jacket of optical fiber 20 and to central bore 15 to further secure optical fiber 20 in central bore 15. When this step is used a fillet of epoxy 19B forms at the inboard end 22 of base 11, or may be added after assembly to further secure fiber 20 in bore 15.

4. The Optical Fiber 20

The optical fiber 20 may be a conventional 1mm, commercial grade poly-optic, multi-mode monofilament, optical fiber lightguide, such as made of polyvinyl chloride ("PVC") and having a Kevlar™ jacket. Alternatively, and preferably, the optical fiber 20 is made of a polymethyl methacrylate polymer having a polyvinyl chloride ("PVC") jacket 146 (see FIG. 7A), and having an additional protective Hytrel™ (polyester elastomer) protective jacketing when required. Equivalent materials are multimode glass optical fiber. Each fiber is pre-calibrated and terminated for lengths of up to 100 feet. In the embodiment of FIGS. 1, 2, 3, 5D and 6, preferably only a single monofilament optical fiber is used for two-way transmission of emitted and reflected light pulses as more fully described below.

As seen in the embodiment of FIG. 2, optical fiber 20 is secured within central bore 15 by threaded compression fitting 25 which compresses O-ring 26 against the outer wall of optical fiber 20 holding fiber 20 securely within bore 15. In the embodiment of FIG. 3, fitting 25 and O-ring 26 are unnecessary.

5. Assembly of the Optical Sensor

The optical sensor 10 shown in FIG. 2 is assembled as follows. First, optical fiber 20 is laid in the aircraft between the wing skin recess 14 and the control display unit 30. Compression fitting 25, O-ring 26, locknut 24 and washer 23 are inserted over optical fiber 20 in that order. Then, lens 16 is glued 19A into the outboard recessed end 21 of the central bore 15 of base 11. Next, the end of the fiber optic is cleaved, indexing gel 19 is squirted into the gap between the lens 16 and the optical fiber 20 and the optical fiber 20 is then inserted into central bore 15 until it is compressed all the way in. Then, the compression fitting 25 is tightened to compress the O-ring 26 against the outside wall of the optical fiber 20 and hold optical fiber 20 securely in place. Base 11 is then secured to surface 14 by tightening locknut 24 and washer 23.

The optical sensor 10 of FIG. 3 is assembled in the same manner as that seen in FIG. 2 except that in the embodiment of FIG. 3 the indexing gel 19, the compression fitting 25, and the O-ring 26 are omitted and the optical adhesive 19A is applied not only to the air gap between lens 16 and optical fiber 20, but also between central bore 15 and optical fiber 20 to secure optical fiber 20 to lens 16 and in central bore 15 eliminating the need for the indexing gel 19, O-ring 26, and fitting 25.

6. Logic/Display Unit

The final component of the system is the control or logic/Display Unit ("LDU") 30 shown schematically in FIGS. 1 and 1A. This unit would fit in a standard instrument panel either 2.25" or 3.5" cutout and would contain all of the electronics for the system. This unit runs on either 12 or 28 volt DC system power and may be implemented in analog or digital technologies.

The LDU 30 is a logic unit which is coupled to the inboard end of the optical channel 20 and houses therein a modulated light source 31 for transmitting light pulses through the optical channel 20 to the optical sensor 10 which reflects an amount of the light pulses indicative of the presence of a substance on the outside surface of the optical sensor 10. As seen in FIG. 1 the light source 31 may include an infrared light emitting diode 33 and a modulator circuit 32 for emitting light pulses having a predetermined frequency. The invention is not limited to using any specific wavelength. In FIG. 1A the light source 33A is a solid state laser source operating in the range from about 630 to 830 nm, and preferably at in the range of 630–670 nm. As seen in FIG. 1 the LDU 30 further includes a light detector 34 which may be a light emitting diode 35 and operational amplifier 36 or, as seen in FIG. 1A is a photo-detector 35A, such as, a filtered phototransister matched to light source 31. Light detector 34 receives the reflected light pulses from the optical sensor 10 through the optical channel 20 and generates an electrical output signal of proportional amplitude to indicate the reflected light pulses. Op amp 36 amplifies the output signal so that it may be utilized in the control/display unit 37. In the preferred form shown in FIG. 1A, and as discussed in greater detail in connection with FIG. 7A below, the light source comprises a solid state light source, such as an LED or laser diode, and the photo-detector is co-located with the light source proximate the inboard end of the optical fiber, and comprises a photo-voltaic detector such as an LED or laser diode. In this preferred form, the co-located emitter and detector share the single optical fiber, and are isolated by a physical divider.

In the form of the invention shown in FIG. 1, the LDU 30 also includes a prism assembly 27 for transmitting the emitted light pulses from the light source 31 to the optical sensor 10 and the reflected light pulses from the optical sensor 10 to the light detector 34. In an alternative mode (not shown) a plurality of mirrors could be used in place of each prism assembly 27. The prism assembly 27 is totally unnecessary and could be omitted entirely and the LED 33A positioned so as to emit light directly into the adjacent end of optical channel 20 while photo-transistor 35A is positioned to receive reflected light pulses directly from the adjacent end of optical channel 20.

Referring to FIG. 7, a modified form of the invention of FIGS. 1 and 1A is shown in which an optical coupler/splitter 100 is employed. An optical fiber 102 couples the optical coupler/splitter to the light source 104. The light source 104 may take the form of a light emitting diode (LED), laser diode or other solid state emitter. An additional optical fiber 106 couples the optical coupler/splitter 100 to the light detector 108. The optical detector 108 may take the form of a photo-diode, photo-transistor or photo-darlington, which operate as photo-conductors. The optical coupler/splitter 100 operates to provide light from the light source 104 to the primary optical fiber 110 leading to the sensor 112. The optical coupler/splitter 100 also operates to split or feed the light returned from the sensor 112 to the light detector 108. In its simplest form, the sensor 112 comprises an attachment fixture that holds the end of the optical fiber 110 substantially flush with the surface to be monitored. In a more complex form, an optional lens 114 may be included. In still more complex forms, the sensor can be configured as shown in FIGS. 2 and 3.

In its preferred form, the optical coupler/splitter takes the form of a lensed multimode wavelength division multiplexer, which is a commercially available product used to allow the use of single optical fiber for simultaneous transmission of bi-directional dual channel signals. Such a device combines two signals onto a single fiber in various internal methods, such as through monolithic lensing, dichroic filter coatings, and reflective combination of the two input channels into a single optical channel. In the embodiment of FIG. 7, use of the coupler/splitter allows an emitter and a detector to be coupled directly each to their own fiber channel and to combine the two channels into a single fiber with minimal crosstalk or signal loss. The combined signal is then communicated to one of the sensing probes via the single fiber. Use of the coupler/splitter also allows the use of off-the-shelf standard emitter and detector components including high-power lasers, and provides an alternative to using more specialized devices such as the coadunate emitter/detector discussed in connection with FIG. 7A.

As a further alternative, the detector 108 can take the form of a light emitting diode or a laser diode, which operates as a photovoltaic source when light impinges upon it, producing a voltage between the anode and cathode. In this further embodiment, the LED or laser diode detectors are responsive only to a narrow optical bandwidth that is centered on the wavelength at which they emit light. Thus, the returning optical signal can be more effectively distinguished from ambient background light levels (such as from sunlight), and saturation of the detector from outside sources can be avoided.

The use of an LED or laser diode as a detector 108 minimizes the need for a narrow bandwidth optical filter in a single optical fiber system. Of course, an additional optical filter can further improve performance. In addition, optional lenses 116 and 118 can be inserted between the light source 104 and the optical fiber 102, and between the light detector 108 and the optical fiber 106. The optional lenses 114, 116 and 118 further optimize the transmission and reception of light through the optical channels or fibers 102,106 and 110.

Using separate optical fibers or channels 102 and 106 leading from the light source and the light detector, and an optical coupler/splitter 100 coupled to the optical fiber leading to the sensor 112, optical crosstalk between the light source 104 and light detector 108 is greatly minimized, if not eliminated. With the elimination of crosstalk, very luminous LEDs and laser diodes can be used to improve optical signal to noise ratio. Even higher levels of light intensity can be achieved by pulsing the LED or laser diode.

FIG. 7A shows in greater detail the embodiment of the invention shown in FIG. 1A, using a co-located (or coadunate) emitter and detector. FIG. 7A shows a closely located light source 104 and light detector 108 with a single optical channel or fiber 110 The optical fiber or channel 110 couples the coadunate emitter 104 and detector 108 to the light sensor 112 located proximate the surface to monitored. The light emitter 104 may take the form of a light emitting diode, laser diode, or other solid state emitter. The optical detector 108 may take the form of a photo-diode, phototransistor, photo-darlington, or other form of photo-detector. Light from the light emitter 104 in the coadunate emitter/detector is transmitted through the optical fiber 110 to the light sensor 112. Light returned from the light sensor 112 via the optical fiber 110 impinges on the co-located light detector 108. The light detector 108 generates an electrical output signal 109 that is proportionate to the amount of light that impinges upon it.

In its preferred form, the coadunate emitter/detector consists of a light emitter 104 and a light detector 108 attached to a printed circuit board or lead frame 138, which is enclosed in a housing 140. Any suitable compression type attachment, such as a nut 142, secures the optical fiber 110 in place above the emitter 104 and detector 108. A divider 144 is incorporated into the housing 140 to optically isolate the emitter 104 from the detector 108, thereby minimizing optical cross-talk.

As a further alternative, the detector 108 can take the form of a light emitting diode or laser diode, which operates as a photo-voltaic source when light impinges upon it, producing a voltage between its anode and cathode. In this further embodiment, the LED or laser diode detectors are responsive only to a narrow optical bandwidth that is centered on the wavelength at which they emit light. Thus, the returning optical signal can be more effectively distinguished from ambient background light levels (such as from sunlight), and saturation of the detector from an outside source can be avoided.

The use of an LED or laser diode as a detector minimizes the need for a narrow bandwidth filter in a single optical fiber system. However, an additional optical filter (not shown) can further improve performance, particularly if the light detector is a photo-diode, photo-transistor, photo-darlington, or other photo-detector susceptible to a wide range of optical wavelengths. Such an optical filter can be incorporated in the form of an interference filter on the surface of the glass cylinder or lens built into the light sensor 112 to protect the external end of the optical fiber form the environment. The glass cylinder/lens can also be provided with optical curvature to optimize the performance of the light sensor. An optional lens in the coadunate emitter/detector can further optimize the transmission and reception of light through the optical filter.

In its preferred form, the coadunate emitter 104 comprises a single LED having a 660 nm wavelength, and the detector 108 comprises a photo-diode. The anode of the LED emitter 104 and the anode of the photo-diode 108 are both coupled to a voltage supply (Vcc). The cathode of the LED emitter 104 is typically coupled to ground through a resistor (not shown) having a value that depends upon the desired LED current. Similarly, the cathode of the photo-diode detector 108 is coupled to ground through a resistance (not shown) in order to obtain an output voltage that varies in accordance with the amount of light that is detected, and the output signal from the detector is monitored between the output of the detector 108 and that resistance.

As discussed above, the presence of clear ice on the monitored surface will result in a decrease in returned light, while the presence of rime ice will result in an increase in returned light caused by scattering. This may result in difficulties in detecting the presence of ice when a combination of clear and rime ice is present. The use of a laser diode as the light emitter and as a detector solves this problem. The light emitted by a laser diode is polarized. When a laser diode is used with single mode optical fiber, light reflected from clear ice remains polarized, while light scattered from rime ice loses its polarization. As a result, the laser diode, or LED in combination with a polarization filter, can detect the presence of ice regardless of the combination of clear and rime ice.

The invention is also capable of self-adjusting to varying ambient or background light levels and contamination on the monitored surface. More particularly, the invention makes use of pulsed light generated by the light source 33, 33A and 104. The light level detected by detector between the pulses is used to assess or quantify the ambient light level and contamination. Only the magnitude of the returned light pulses are used by the processing electronics to detect the presence and nature of fluid or ice on the monitored surface.

In the digital implementation of LDU 30, the LDU 30 includes a digital computer (not shown) for providing and controlling a display signal indicative of the output signal from the light detector 34 and a display for visually presenting the display signal. The display unit 37, as seen in FIGS. 1, 1A uses LEDs to indicate a warning for clear ice 38, rime ice 39, rain 40, and a de-icing fluid 41, for example, Goodyear¬ Glycol standard types I, II, or IV. The computer 30 may also calculate and display as by LEDs 42 an indication of the amount or rate of ice accretion. As seen in FIGS. 1, 1A, LED 42 comprises a multi-part display which includes a plurality of vertical bars having a first shading or color and the bars are split into left and right groups, each group arranged in a stair-step configuration increasing in height toward the center of the display. The left group represents the left half of the aircraft surfaces where sensors 10 are located and the right group represents the right half of such surfaces. As ice accretes on the surfaces and is sensed by sensor 10 the bars increasingly take on a second shading or color from outboard to inboard bars. The amount of the bars having the second shading or color represents the amount of ice accretion. The rate at which the bars change color represents the rate of ice accretion. The bars are calibrated to reflect degree of dangerous ice accretions. Additionally, there are LED display 43 to indicate the system is on and operating properly and LED 44 to warn the pilot of system failure.

Finally, the computer 30 may also issue an audible warning, such as, a tone or digitized voice warning that ice is forming. It may also automatically generate a control signal to activate de-icing equipment in areas of ice accumulation. In the form of the invention of FIG. 1A, an analog implementation of logic or control unit 30 comprises a plurality of hard wired integrated logic circuits.

7. Operation of the System

Figure 4:
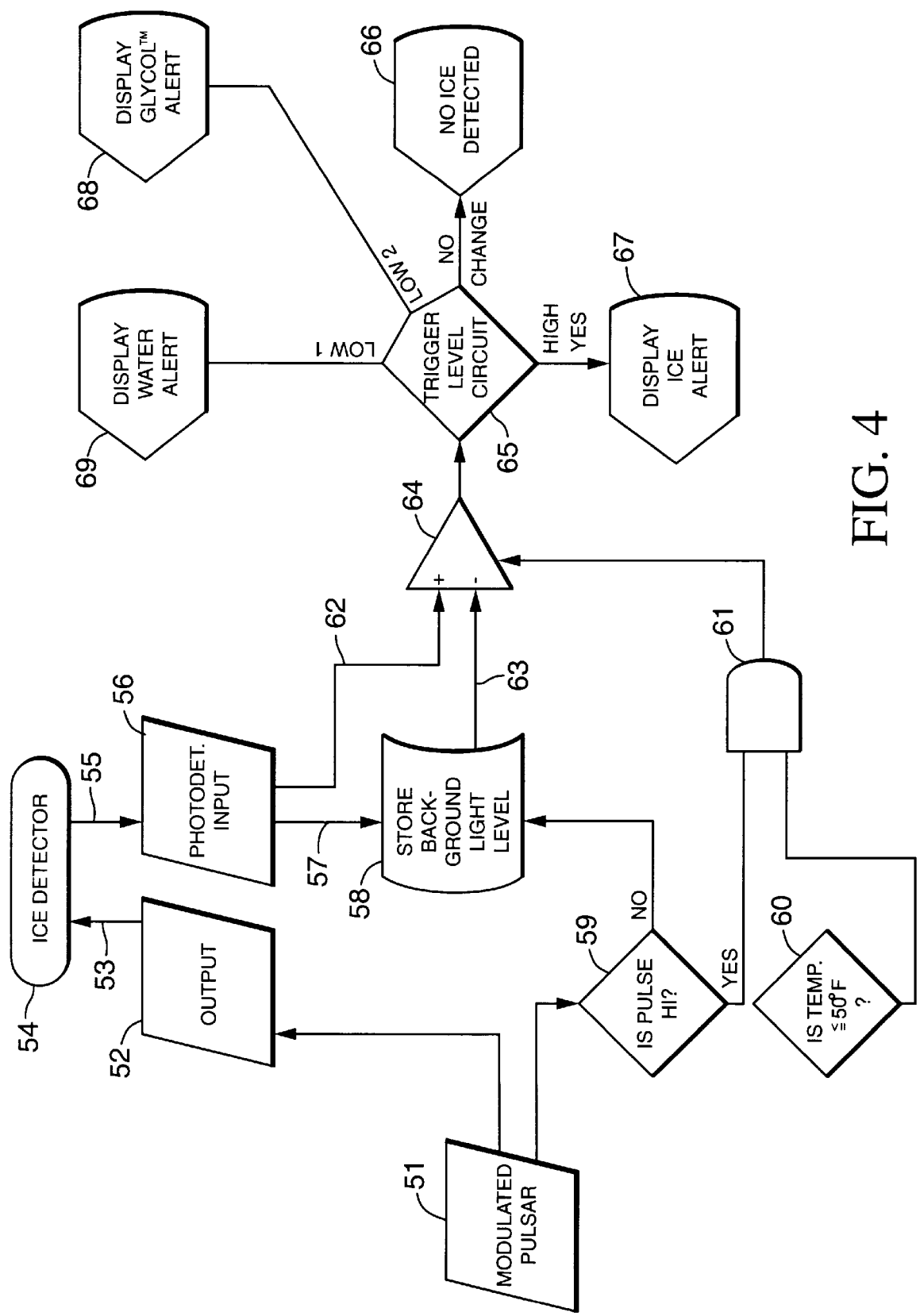
FIG. 4 is a flow chart of one form of the process used in the logic unit of the present invention.

The operation of the system is best understood by reference to FIG. 4 which is a flow chart of the logic of the integrated circuits of the analog implementation of logic unit 30 and is also the logic of the computer program in the microprocessor contained in the implementation of a computer digital logic or control/display unit 30.

Modulated purser 51 may be simply an integrated circuit flasher which triggers solid state light source output 52 to emit light pulses through the light channel 20 in the outbound direction 53 to the ice detector 54. A variable amount of the pulsed light is reflected back into the ice detector 54 due to the presence of water, de-icing fluids, clear ice, or rime ice on the exterior surface of ice detector 54. The amount of reflected light is predetermined and pre-calibrated to detect and identify the type, amount and rate of build up of substance covering light sensor 10. A no-ice condition (air covers light sensor 10) would result in a preset biasing level. Any reflected light travels via light channel 55 in an inbound direction where it is received by the photodetector input 56 which generates a voltage proportional to the returned light level. The voltage level output of photodetector 56 is sent via line 57 to be stored as background light level 58 during the low period of the pulse 59 during which time the background storage is enabled. The voltage level is also sent via line 62 to the positive terminal of summation circuit 64. The background light level from storage 58 is provided via line 63 to the negative terminal of summation circuit 64 which is enabled only when the pulse output is high on one terminal of AND gate 61 and the temperature is equal to or less than 50 degrees F., which enables the other terminal of AND gate 61 thereby turning on summation circuit 64. Optionally, the temperature probe 60 may be eliminated to provide a less expensive, but also, less accurate alternative. In that case, AND gate 61 may be eliminated and summation circuit 64 enabled directly by HI pulse 59.

Storage of the reflected light pulses as background light level in storage 58 during the low period of the output pulses effectively records ambient light. Storage 58 is accumulative storage. If there is no coverage on the light sensor 10, a baseline light level will be reflected or returned back. Accumulated fluid causes decreased reflection from the zero level setting of the system while accumulated rime ice causes increased reflection from the zero level setting of the system due to scattering within the ice, and causes a higher reflected signal output on line 57 which is cumulatively stored in storage 58 and then compared via line 63 to the still further increased or decreased light levels appearing on line 62 of the summation circuit 64. Thus, the quantum of the output signal of the summation circuit 64 is indicative of the type and amount of covering on the ice detector 54 and represents a stored trigger level to operate circuit 65 which will actuate any one of four LEDs in display 37. The analog circuits or microprocessor controlling the summed output can also detect the rate of accretion reflected in the output signal of the summation circuit 64.

As discussed above, in the situation where clear ice is formed on the surface, the amount of returned light will be nearly similar to the amount of light returned when water is accumulated on the surface. However, because the ice is solid, the amount of returned light does not widely or rapidly vary. In comparison, when water is present on the surface, there is a component of the returned light that is attributed to the water/air interface, which due to the fluid nature of water, is varying component. The variation in the returned light when water or fluid is present is a factor that is detected by the processing circuit and used to distinguish water from clear ice.

Finally, the voltage proportional to the level of light received by photo-detector 56 when air covers sensor 10 is set as the zero level of the system. If the output level of summation circuit 65 does not change, then air but no ice has been detected and stored trigger level circuit 65 displays no ice detected 66. If the output level of summation circuit goes higher due to increased reflected light above the zero level setting, then stored trigger level circuit 65 schematically displays the ice alert 67 (such as in a bar graph LEDs) and via the audio driver circuit (not shown) which provides a warning tone or digitized voice warning. If the output of summation circuit 64 decreases to level LOW 2, then the stored trigger level circuit 65 displays the de-icing fluid alert 68 which in the example shown in FIG. 4 is Glycol. If the output of summation circuit 64 decreases further to level LOW 1, then the stored trigger level circuit 65 displays the water alter 69. In the embodiment configured to detect the difference between clear ice and water, the system must further determine if the amount of returned light is varying rapidly, as discussed below, and if so, would indicate the presence of water. If the reduced amount of light is not varying, than an indication of the presence of clear ice would be given.

All of the electronics circuitry may be contained behind the panel mounted display in, for example, a 3.5"×6.0" deep "can" or similar small self contained display. The total system would weigh less than 2 pounds. The entire unit may be manufactured at a cost substantially below existing competitive units.

8. Fuselage Surface Mounted Ice/Fluid Sensor

As best seen in FIGS. 5A, 5B, 5C and 5D a second embodiment of the present invention in the form of a fuselage surface mounted ice/fluid sensor 70 is shown having an airfoil shaped probe 71 fixedly mounted to a flange type base 72 and is designed to provide minimum drag. (Less drag than a ⅛" antenna of same length). Sensor 70 protrudes about two inches into the air stream, in the embodiment shown. Surface mounted sensor 70 is mounted like a pitot tube or antennae mounted to a fuselage surface such that the housing or probe portion 73,71 projects into the air stream and the base portion 72 is screwed to the external fuselage surface by screws in the holes shown in FIG. 5A. The cord line of the airfoil shape 71 should be parallel to the longitudinal axis of the aircraft so that it makes a zero angle of attack and provides minimum drag in the air stream. The airfoil shaped portion 71 has a transparent leading edge 73 being the forward portion of a lucite or other clear rod, the trailing portion 73A of which is contiguous with the fiberglass fairing 74. Rod portion 73 may be made of acrylic, or may be a glass rod. Rod 73 is attached to the rounded recess of airfoil body 71 by an epoxy adhesive of the type previously described above. The airfoil shaped portion 71 is hollow and dielectric and may be used to house a transponder antenna with leads extending through the aircraft skin to internal equipment.

Probe 70 is preferably made of an injection molded ultraviolet resistant poly-carbonate material and is chrome plated. It may also be colored if desired.

Figure 5A:
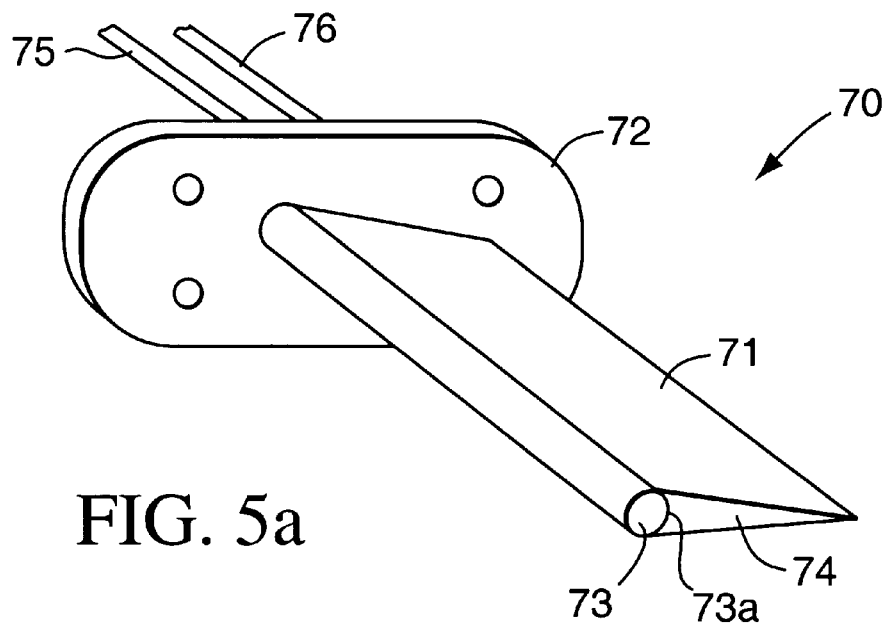
FIG. 5A is a perspective view of a second embodiment of the optical sensor of the present invention.
Figure 5B:
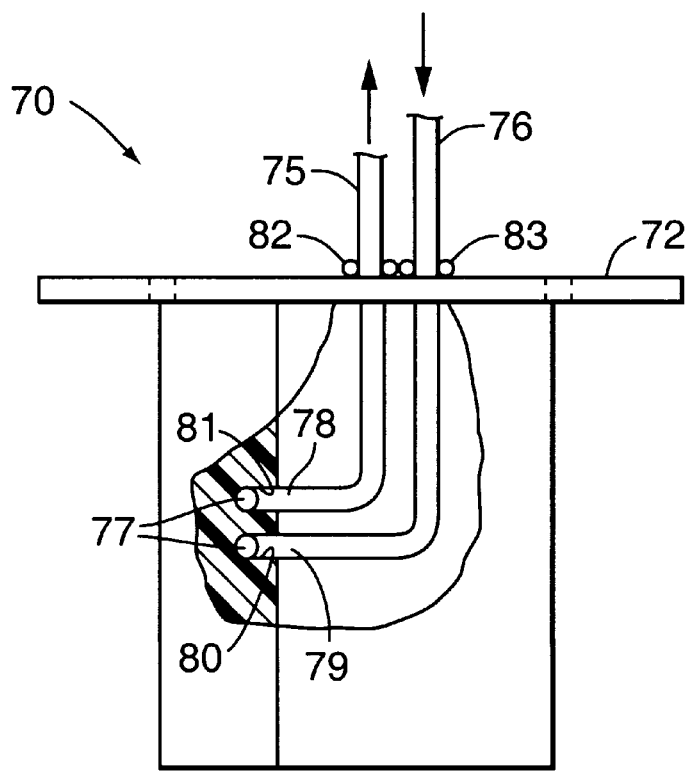
FIG. 5B is a plan view in partial section of one form of the optical sensor of FIG. 5A.

As seen in one form of the invention shown in FIG. 5B, disposed within probe 70 is a pair of monofilament multi-mode 1mm plastic communications jacketed fibers for transmitting therethrough outbound light pulses 76 and inbound reflected light pulses 75. Preferably, however, as seen in the first embodiments of FIGS. 1, 1A, 2, and 3 and described in greater detail below with respect to this second embodiment FIG. 5D, a single 1 mm polyoptic, multi-mode monofilament, optical fiber light guide made of PVT with a Kevlar™ jacket may be used. In FIG. 5B the outboard ends of optical fibers 78,79 are secured in drilled holes 80,81 in the rearward wall of lucite or clear rod or lens 73 by indexing gel 77. The longitudinal axis of bores 80,81 and of fibers 78,79 are preferably perpendicular to a plane tangent to the point on surface 73 being sensed by sensor 70. The gel 77 optically fuses the light pipes 78,79 to the lucite or clear rod 73 as a baseline measurement. As a light sensor, probe 70 functions in the same manner as light sensor 10 previously described with respect to FIGS. 1–4. Light pulses are transmitted from light source 33,33A outbound in pipe 76,79. An amount of light is reflected from the lucite to external media interface depending on the nature and amount of substance covering the lucite or clear rod 73, i.e., when air covers the lucite or clear rod 73 as a base measurement. In the absence of a covering substance, a baseline amount of light is reflected in inbound pipe 78,75 and the system is zeroed out based on this level of reflection. A liquid coating, such as, water or Glycol antifreeze, decreases the amount of reflected light to the zeroed level by refracting outwardly more light. When level LOW 2 is reached, the relative Glycol LED is displayed. When level LOW 1 is reached, the water LED is displayed. As above, a further embodiment of the invention would detect the presence of clear ice by analyzing the decreased amount of returned light for the presence of a rapid variation, the absence of which indicate the presence of clear ice. In comparison, as a solid covering of rime ice accretes on the leading edge of lucite or clear rod 73, an increasing amount of reflected light above the zeroed out level is directed into inbound pipe 78,75 causing an icing signal to be generated and displayed as previously described. The inboard ends of optical fibers 78,79 extend through the base 72 of probe 70 and are coupled to the cockpit control or logic/display unit 30 and grommeted to base 72 of probe 70 for securement thereto.

Figure 5C:
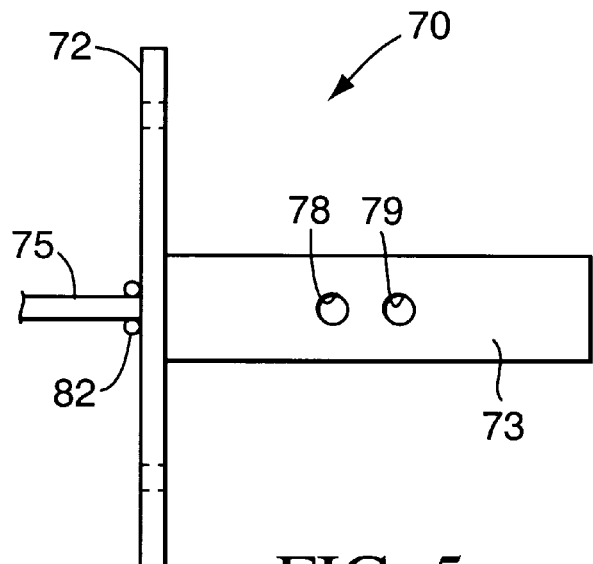
FIG. 5C is a front elevation of the optical sensor of FIG. 5C.
Figure 5D:
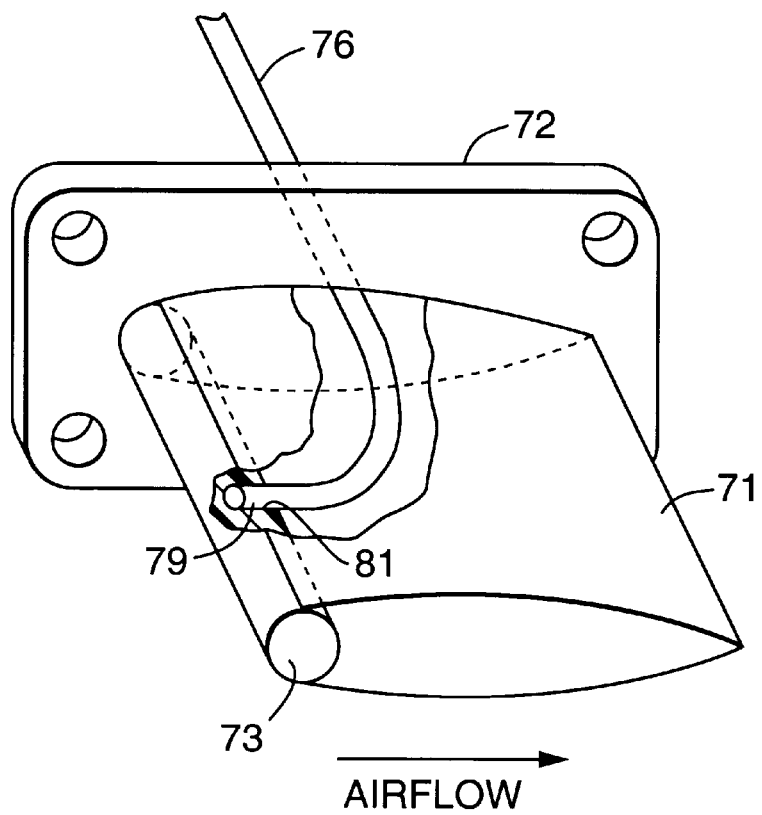
FIG. 5D is a perspective view in partial section of a modified form of the second embodiment of the optical sensor of FIG. 5A with the optical sensor mounted parallel to the chord line of the airfoil shaped probe.

As shown in FIG. 5D is a modified and preferred form of the second embodiment of the present invention where the same numbers are used to identify the same parts as in FIGS. 5A, 5B, and 5C. In FIG. 5D probe 71 is secured to the airframe fuselage by screwing base 72 thereto. Optical fiber 76 is a multi-mode, monofilament optical fiber identical to optical channel 20 previously described, secured in lucite or other clear rod or lens 73 by an optical grade adhesive identical to adhesive 19A previously described, and functions to send light pulses outbound to the polished end of 79 of the channel where light is passed through the lucite or clear rod 73 to the interface between the surface of the rod or lens 73 and its overlying media. Light is reflected back through rod or lens 73 and into the outboard end 79 of optical fiber 76, the inbound light pulses being transmitted to the photo-detector 35,35A in logic unit 30. The longitudinal axis of fiber 79 at the point where it is secured in bore 81 in clear rod or lens 73 is perpendicular to a plane tangent to the surface at the leading edge of clear rod or lens 73 being sensed. The readouts on display 37 are identical to those previously described with respect to FIGS. 1, 1A and 4. In addition to lucite, the rod or lens 73 may be manufactured of glass. Also, in accordance with FIG. 7A, above, a single optical fiber 76 may be flush mounted in the leading edge of the airfoil 71, thereby omitting any need for the clear rod 71.

9. Carburetor Induction Ice Detection

Shown in FIG. 6 is a third embodiment of the present invention which functions to detect carburetor ice which forms in the induction system of an aircraft, such as, in the throat of the carburetor body where lower than outside air temperatures are reached due to the well known "venturi effect". Identical numbers in FIG. 6 refer to identical parts previously described above. In the embodiment of FIG. 6, the optical fiber 20 is a single, multi-mode monofilament optical fiber as previously described. Optical fiber 20 is mounted and secured within central bore 15 of base 11 which is a brass machined threaded body screwed to and flush mounted in the throat 91 of carburetor 92. An existing mounting hole common to all carburetor, may be used. The polished end 79 of fiber 20 is optically coupled, as by being glued by an optical, index-matching, UV-cured, optical adhesive of a type previously described, into a bore 80 of a lens 93 (acrylic or glass) which projects normal to the surface of the throat into the intake airstream. Preferably, in the example shown, the longitudinal axis of fiber 20 and bore 80 are perpendicular to the air flow through the throat of carburetor 92. However, the axis and bore may also be placed at an acute angle to that airflow in this embodiment. Outbound light pulses contact the interface between the lens 93 and its external media. An amount of light is reflected back optical fiber 20 depending on the nature and amount of ice covering the surface of lens 93 and are displayed on logic displays 37 as previously described above.

Other embodiments of the sensor of FIG. 6 include inside a throttle body on a fuel injected engine, or in an engine air intake.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A substance detection system comprised of:
    (a) an optical sensor placed proximate a surface to be monitored and configured to return light pulses as a function of the presence or absence and type of substance on the monitored surface;
    (b) a first optical channel coupled at its outboard end to the optical sensor;
    (c) an optical coupler/splitter coupled to the inboard end of the first optical channel;
    (d) a second optical channel coupled at its outboard end to the optical coupler/splitter;
    (e) a light source coupled to the inboard end of the second optical channel, and configured to generate light pulses that are communicated through the second optical channel, the optical coupler/splitter and the first optical channel, to the optical sensor;
    (f) a third optical channel coupled at its outboard end to the optical couple splitter;
    (g) a light detector coupled to the inboard end of the third optical channel, and configured to detect light pulses that are returned from the optical sensor, through the first optical channel, the optical coupler and the third optical channel, and generating an output signal that varies in accordance with variations in the detected light pulses;
    (h) a processing circuit coupled to the output of the light detector and configured to analyze the output signals and determined the presence and type of substance on the surface to be monitored, and including an output defining the presence and type of substance on the surface; and
    (i) an indicator coupled to the output of processing circuit and configured to indicate the presence and type of substance on the surface.

2. The substance detection system of claim 1 wherein the substance includes water, ice and de-icing fluid.

3. The substance detection system of claim 2 wherein the ice includes rime and clear ice.

4. The substance detection system of claim 3 wherein the processing circuit determines the presence of rime ice on the monitored surface by detecting an increased amount of the light pulses returned by the optical sensor.

5. The substance detection system of claim 3 wherein the processing circuit differentiates between water and clear ice by detecting a variation in the amount of the light pulses caused by the presence of water on the monitored surface, which variation is substantially absent from the returned light pulses when clear ice is present on the monitored surface.

6. The substance detection system of claim 2 wherein the processing circuit determines the presence of clear ice on the monitored surface by detecting a decreased amount of the light pulses returned by the optical sensor.

7. The substance detection system of claim 2 wherein the processing circuit determines the presence of water on the monitored surface by detecting a decreased and rapidly varying amount of the light pulses returned by the optical sensor.

8. The substance detection system of claim 1 wherein the processing circuit monitors and compensates for the amount of ambient and background light detected in-between pulses returned from the optical sensor.

9. The substance detection system of claim 8 wherein the optical sensor comprises a probe including a clear lens inserted into the induction area of a carburetor, and wherein an amount of the light pulses are returned by the detector as a function of the interface between the clear lens and the surrounding atmosphere.

10. The substance detection system of claim 1 wherein the optical sensor comprises:
    (a) a lens mounted substantially flush to the monitored surface;
    (b) an indexing gap between the lens and the optical channel; and
    (c) an indexing gel filling the gap.

11. The substance detection system of claim 10 wherein the monitored surface is a wing of an airplane, and the optical sensor is mounted within a rivet in the wing.

12. The substance detection system of claim 10 wherein the monitored surface is an airfoil-shaped probe mounted on a fuselage of an airplane, and the optical sensor is secured in a hole formed in a leading surface of the probe.

13. The substance detection system of claim 1 wherein the optical splitter/coupler comprises a lensed multi-mode wavelength division multiplexer.

14. The substance detection system of claim 1 wherein the light source comprises a solid state emitter.

15. The substance detection system of claim 1 wherein the light source comprises a laser diode.

16. The substance detection system of claim 1 wherein the light source comprises light emitting diode.

17. The substance detection system of claim 1 wherein the light detector comprises a photo-detector.

18. The substance detection system of claim 17 wherein the photo-detector comprises a photo-voltaic detector that emits light and that is responsive to light in a narrow bandwidth centered on the wavelength at which it emits light.

19. The substance detection system of claim 18 wherein the photo-detector acts as a filter by rejecting ambient light.

20. The substance detection system of claim 18 wherein the photo-detector comprises a laser diode.

21. The substance detection circuit of claim 20 further comprising an optical lens coupled between the optical sensor and the outboard end of the first optical channel.

22. The substance detection system of claim 18 wherein the photo-detector comprises an LED.

23. The substance detection system of claim 1 wherein each optical channel comprises a plurality of individual and substantially parallel optical fibers.

24. The substance detection circuit of claim 1 wherein the processing circuit comprises a microprocessor including a computer program configured to complete the analysis of the output signal generated by the detector.

25. The substance detection circuit of claim 1 further comprising an optical lens coupled between the light source and the inboard end of the second optical channel; and between the light detector and the inboard end of the third optical channel.

* * * * *